Nov. 7, 1950  E. W. PLUMB  2,528,909
WORK HOLDER
Filed July 11, 1946
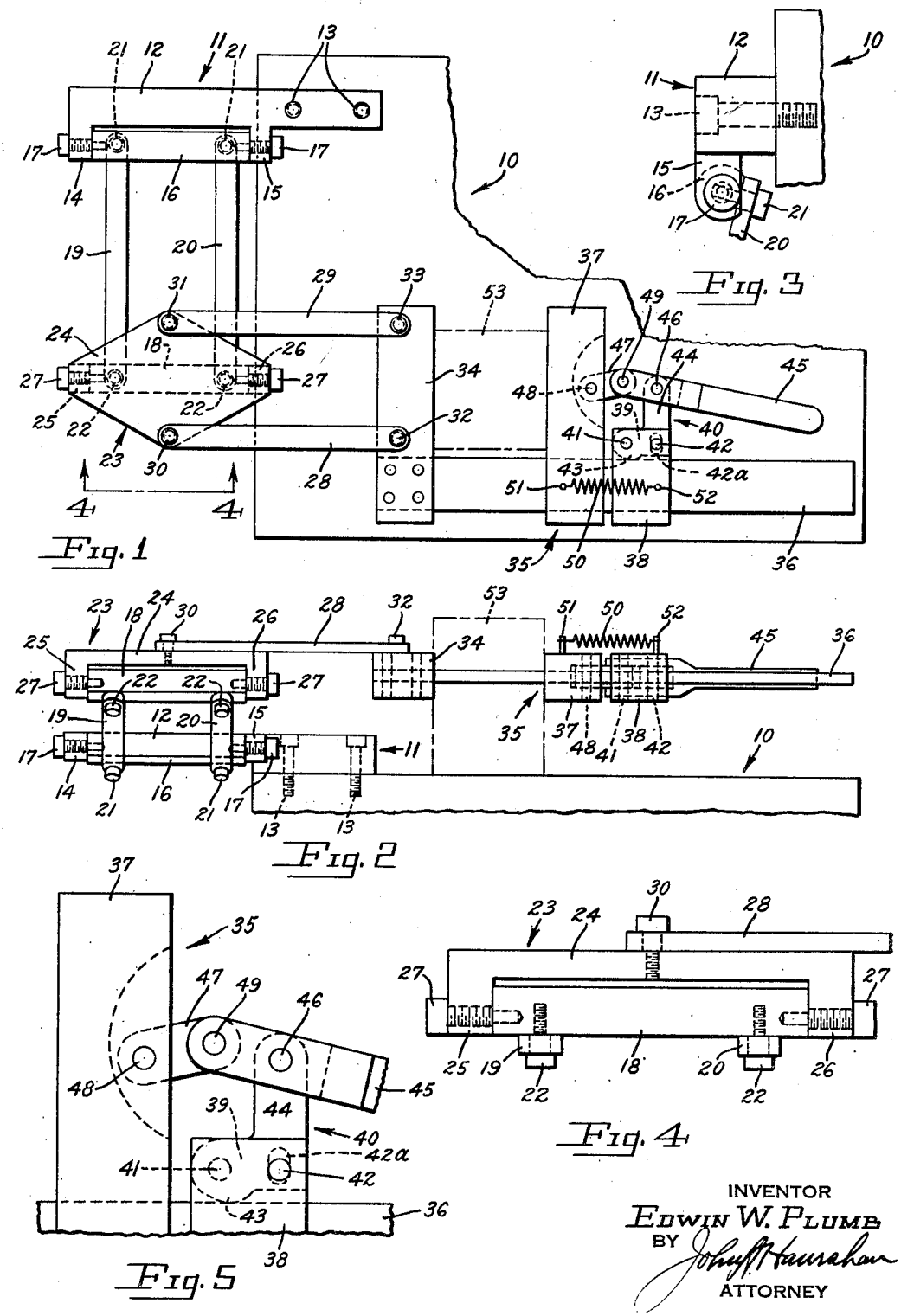
INVENTOR
EDWIN W. PLUMB
BY
John H. Hanrahan
ATTORNEY Patented Nov. 7, 1950

2,528,909

UNITED STATES PATENT OFFICE 2,528,909

WORK HOLDER

Edwin W. Plumb, Morris, Conn.

Application July 11, 1946, Serial No. 682,747

2 Claims. (Cl. 144—290)

1

This invention relates to new and useful improvements in work holders and has particular relation to a work holder adapted for rapidly gripping and positioning work on a drill press or the like, and retaining the work against twisting or turning under the action of a drill or other tool.

The objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 1 is a top plan view of the work holder of the invention in place on the table of a drill press;

Fig. 2 is an edge elevational view looking from the lower edge of Fig. 1;

Fig. 3 is an enlarged detail elevational view looking from the right into the attaching bracket or support;

Fig. 4 is an enlarged elevational view taken as suggested by the line 4—4 of Fig. 1; and Fig. 5 is an enlarged plan view of the toggle locking means for the movable jaw of the work clamp.

The present invention provides a means for holding work whereby drill press operations on the work may be safely and expeditiously performed. At present, where small holes are to be drilled, it is a common practice for the operator to hold the work in his hand to prevent the work from turning with the drill. Where larger holes are to be drilled, the work is either strapped to the table of the drill press or is held in a vise or jig which may be clamped in place on the table or which may be of sufficient mass to resist the twisting action of the drill. Thus, at the present time, the drilling of holes of moderate size is hazardous when the work is held by hand and is a slow process when each piece of work is clamped to the table of the drill press.

My invention provides means for overcoming the above difficulties and comprises a device which may be conveniently attached to the work table of a drill press and may be readily used to restrain work from turning with the drill of the press. The work holder of the invention is constructed to provide for ready shifting to various positions over the drill press table whereby

2 to bring successive hole locations under the drill. The present construction permits of the work being almost instantly positioned as desired on or over the work table and is attachable to practically any type of drill press and will effectively prevent revolving of the work under the cutting action of the drill.

Referring in detail to the drawing, at 10 is generally shown a portion of the bed of a drill press to which is attached the work holder of the invention. The work holder includes a support or mounting means 11 comprising an elongated body 12, one end portion of which is held to the table 10 by machine screws or the like 13. Projecting from one side of the body 12 are a pair of parallel lugs 14 and 15. Located between the lugs 14 and 15 is a bar 16 mounted for turning movement about its own longitudinal axis. This bar while turnable relative to the body 12 is part of the mounting means or support 11, as will appear. The mounting for the bar 16 may take various forms but in the drawing such mounting is shown as comprising pivot screws 17 threaded into the lugs and having smooth journal portions entering the ends of the bar in line with its longitudinal axis.

In parallel spaced relation to the bar 16 is a bar 18. A pair of parallel links 19 and 20 are pivoted at their respective ends to the bars 16 and 18. Thus, shoulder screws 21 serve to pivotally connect the inner ends of the links 19 and 20 with the bar 16 while similar screws 22 serve to connect the outer ends of said links with the bar 18. The assembly just described, including the parallel bars 16 and 18 and the parallel links 19 and 20 pivoted to such bars, comprises a structure in the nature of a pantograph.

Mounted on the bar 18 for turning movement relative to the longitudinal axis thereof, is a member generally designated 23. Such means comprises a more or less diamond-shaped plate 24 having depending end portions or lugs 25 and 26 disposed at the respective ends of the bar 18. A pair of screws or pivot means 27, similar to the screws 17, are threaded into the lugs 25 and 26 and have their inner end portions entering and constituting bearing or pivot points whereby the bar 18 and member 23 are movable relatively about an axis coincident with the longitudinal axis of the bar.

A second pair of spaced parallel links 28 and 29 are provided and at corresponding ends, such links are pivotally attached to spaced portions of the plate 24 as by the shoulder screws 30 and 31 respectively. At their other ends, the links 28 and 29 are pivotally attached, by means of shoulder screws 32 and 33 respectively, with the fixed jaw 34 of a quick-acting clamp generally designated 35. The jaw 34, together with the links 28 and 29 and the plate 24, forms a second pantograph-like means.

Rigid with the jaw 34 and disposed at right angles thereto is a handle or shank 36 along which a movable jaw 37 of the clamp 35 is slidable. As shown, shank 36 passes through the inner end portion of the jaw 37 and the latter extends at right angles to said shank and in parallel relation with the jaw 34. In addition to the mentioned jaws and shank, the quick-acting clamp 35 includes a clamping member 38 also slidable on the handle 36 at the outer side of jaw 37 and having an opening or slot into which enters a foot portion 39 of a bell crank lever 40. A pivot 41 through the toe portion of the foot or arm 39 of the bell crank lever 40 pivotally connects the latter with the member 38. Additionally, a pin 42 is carried by the member 38 and passes through an arcuate slot 42a in the arm 39 of the bell crank. At its toe portion said arm 39 is enlarged providing a cam portion as at 43 adapted to be clamped against an edge of the handle 36, as will be described.

The second arm 44 of bell crank 40 extends outwardly with respect to member 38 and pivoted to the outer end of said arm is a clamping handle 45. The pivot for such purpose is designated 46 and passes through the handle 45 intermediate the ends of the latter. A link 47 is pivoted to the jaw 37 at 48 and to the inner end of the clamp handle 45 as at 49. This link connection of the handle with the jaw 37 provides a sort of toggle construction in which the pivot 49 is movable up and down or in and out, to and through a dead center position with respect to the pivots 46 and 48.

When the handle 45 is in the position shown in Figs. 1 and 5, the clamping member 38 is locked to the shank 36 as the cam portion 43 is forced against such shank. On rocking movement of the handle (or lever) 45 in the opposite direction the pin 49 is shifted downwardly as the bell crank 40 is rocked on pivot 41 to carry its cam portion 43 into a released position with respect to the shank 36.

A coil spring 50 is anchored at its respective ends to its pins 51 and 52 carried respectively to the jaw 37 and the member 38. This spring tends to keep the member 38 against the outer side of the jaw 37 so that the jaw and member are kept in parallel relation and at right angles to the shank 36. Thus, both the jaw and member are prevented from tilting or canting or accidentally binding on the shank 36.

When the device is to be used, a piece of work, as the block 53 shown by broken lines, is disposed between the jaws 34 and 37. Then the jaw 37 is shifted along the shank 36 until it engages the work. Thereafter the lever 45 is rocked to the position of Fig. 1 wedging the cam portion 43 of the bell crank against the shank 36 and locking the jaw 37 in clamping relation to the work. Additionally as such lever is so rocked the pin 49 is carried through a dead center position to a point outwardly with respect to the pivots 46 and 48 so that there is no danger of the work being accidentally released.

Furthermore, as this action takes place there is a slight further thrust forwardly on the jaw 37 insuring very tight clamping of the work. In addition to the function above pointed out, the spring 50 permits of locking of the movable jaw on the shank when there is no work against which the movable jaw may be forced. Without the spring there is a tendency of the jaw 37 to slide on the shank even though lever 45 is in locking position when work is not being clamped or is only being loosely clamped. The spring puts enough load onto the jaw to permit of the locking of the latter under such conditions.

From the foregoing description it will be seen that I have provided a structure in the nature of a double pantograph comprising a compound linkage in which the jaw 34 will always be at right angles to the bar 12 or the bar 16 and wherein the shank 36 will always be parallel with such bars. When work is held in the clamp as shown in the drawings by manipulating the work or the handle 36 the work is rapidly shifted to any desired position on the table 10.

Owing to the presence of the described linkage, the work is easily located and is easily retained in the desired position under the drill. It may rapidly be shifted to bring various portions into line with the drill. Where the work is relatively thick or where it is desired to support the work somewhat above the table, as on guides or bars, this is easily accomplished since the entire device may be raised to a position above the table. This is as shown in Fig. 2 and such positioning of the device is permissible owing to the fact that the bar 16 of the support or mounting means 11 is mounted for turning movement on the pivot screws 17.

Since the quick-acting clamp of the invention grips the work at its edges, it is possible to have the drill pass entirely through the work at any point. Further, the work may be freely moved to bring successive hole locations under the drill without releasing and reclamping it. The work is free to align itself with the drill after a hole is started thereby tending to remedy any tendency of the drilled holes to wander when carelessly located. Additionally, the ease of operation of the device adapts it for either one piece jobs or long production runs and encourages the operator to properly clamp his work instead of risking broken tools and injured fingers as heretofore.

Having thus set forth the nature of my invention, what I claim is:

1. A quick acting clamp comprising a jaw and a shank rigid with said jaw, a jaw movable along said shank toward and from said fixed jaw, means to clamp the movable jaw to said shank, said means including a clamping member slidable on said shank in the rear of said movable jaw, a bell crank having an arm entering said member for engagement with said shank, said arm having a cam-shaped end portion, means pivoting the cam-shaped end portion of said arm to said member, said bell crank having a slot in its heel portion, a pin rigid with said member and entering said slot, said bell crank having its other arm extending from said member, a handle pivoted intermediate its ends to the outer end of said other arm, and a link pivoted to said movable jaw and the adjacent end of said handle whereby on rocking of said handle in one direction the cam-shaped end portion of the bell crank arm is released from the shank and the member and movable jaw may be shifted along the shank and on rocking of the handle in the opposite direction said cam-shaped end portion of the bell crank arm is rocked into a camming engagement with the shank to lock the member thereto and further movement of the handle in the same direction carries its pivotal connection with the link through a dead center position to force the movable jaw tighter against a piece of work between the fixed and movable jaws and lock said movable jaw in clamped position.

2. A quick acting clamp comprising a jaw and a shank rigid with said jaw, a jaw movable along said shank toward and from said fixed jaw, a clamping member encircling said shank and slidable along the same in the rear of said movable jaw, said member having an opening therethrough from one edge to said shank, a lever having its inner end portion entering said member through said opening, means pivoting said lever inner end portion to said member, a handle pivoted intermediate its ends to the outer end portion of said lever, and a link pivoted at its respective ends to said movable jaw and the adjacent end of said handle whereby on rocking said handle in one direction the inner end portion of said lever is released with respect to the shank and the movable jaw and member may be shifted along the shank and on rocking of the handle in the opposite direction the inner end portion of the lever causes locking of the member to the shank by drawing the same tight thereagainst and then or further rocking of the handle in the last mentioned direction to straighten the handle and link relatively and further force the movable jaw toward the fixed jaw.

EDWIN W. PLUMB.

REFERENCES CITED

The following references are of record in the file of this patent:

UNITED STATES PATENTS

| Number | Name | Date |
|---|---|---|
| 606,317 | Van Schoick | June 28, 1898 |
| 670,890 | Burgess | Mar. 26, 1901 |
| 722,677 | Crippen et al. | Mar. 17, 1903 |
| 2,136,140 | Langsner | Nov. 8, 1938 |
| 2,236,881 | Rusnak | Apr. 1, 1941 |
| 2,260,157 | Zwick | Oct. 21, 1941 |
| 2,276,819 | Boehmer | Mar. 17, 1942 |
| 2,369,346 | Gearhart | Feb. 13, 1945 |